United States Patent [19]

Faldi

[11] 4,140,437
[45] Feb. 20, 1979

[54] APPARATUS FOR THE LONG DISTANCE CONVEYING OF LIQUIDS MIXED WITH SOLID SUBSTANCES USING A COMPRESSED AIR PUMP

[76] Inventor: Giovanni Faldi, Via Forese Donati 27, Firenze, Italy

[21] Appl. No.: 700,137

[22] Filed: Jun. 28, 1976

Related U.S. Application Data

[63] Continuation of Ser. No. 339,288, Mar. 8, 1973, abandoned.

[30] Foreign Application Priority Data

Mar. 20, 1972 [IT] Italy ............................... 22116 A/72

[51] Int. Cl.² ............................................. F04F 1/06
[52] U.S. Cl. .................................. 417/122; 417/427; 417/900
[58] Field of Search ................... 417/4, 122, 123, 125, 417/147, 62, 900, 426, 427, 118, 137, 145; 302/14–16

[56] References Cited

U.S. PATENT DOCUMENTS

| 3,173,379 | 3/1965 | Jolly | 417/123 |
| 3,659,966 | 5/1972 | Faber | 417/900 X |
| 3,751,184 | 8/1973 | Buchwald et al. | 417/426 X |

*Primary Examiner*—Carlton R. Croyle
*Assistant Examiner*—Edward Look
*Attorney, Agent, or Firm*—Karl W. Flocks

[57] ABSTRACT

An apparatus for conveying liquids mixed with solid substances to a distance is disclosed, comprising a compressed air pump formed by two or more cylindrical chambers, each provided with an inlet valve for the liquid and with a connection for the inlet and discharge of compressed air, which is cyclically and alternatively fed into and expelled from the cylinders under the control of a proper distributor, the apparatus comprising a free surface loading hopper located upstream and above the pump body, having an outlet communicating with said inlet valves of the cylindrical chambers, whereby the flow rate of the liquid arriving to the hopper is continuously compensated so as to uniformly feed the liquid by gravity to the cylindrical chambers, the apparatus further comprising at least a spare cylindrical chamber adapted to be used in substitution for one of the normally operating cylindrical chambers, for servicing and/or maintenance purposes.

1 Claim, 5 Drawing Figures

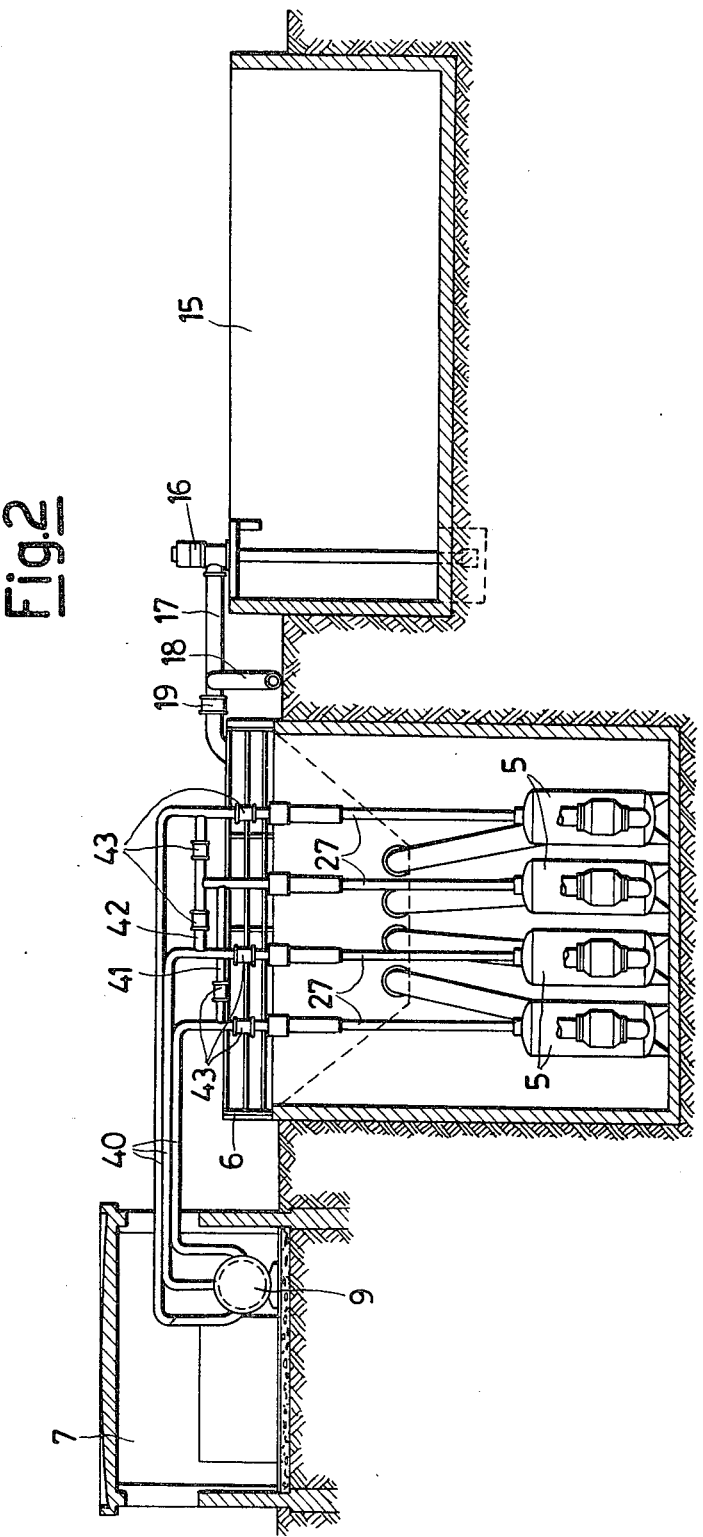

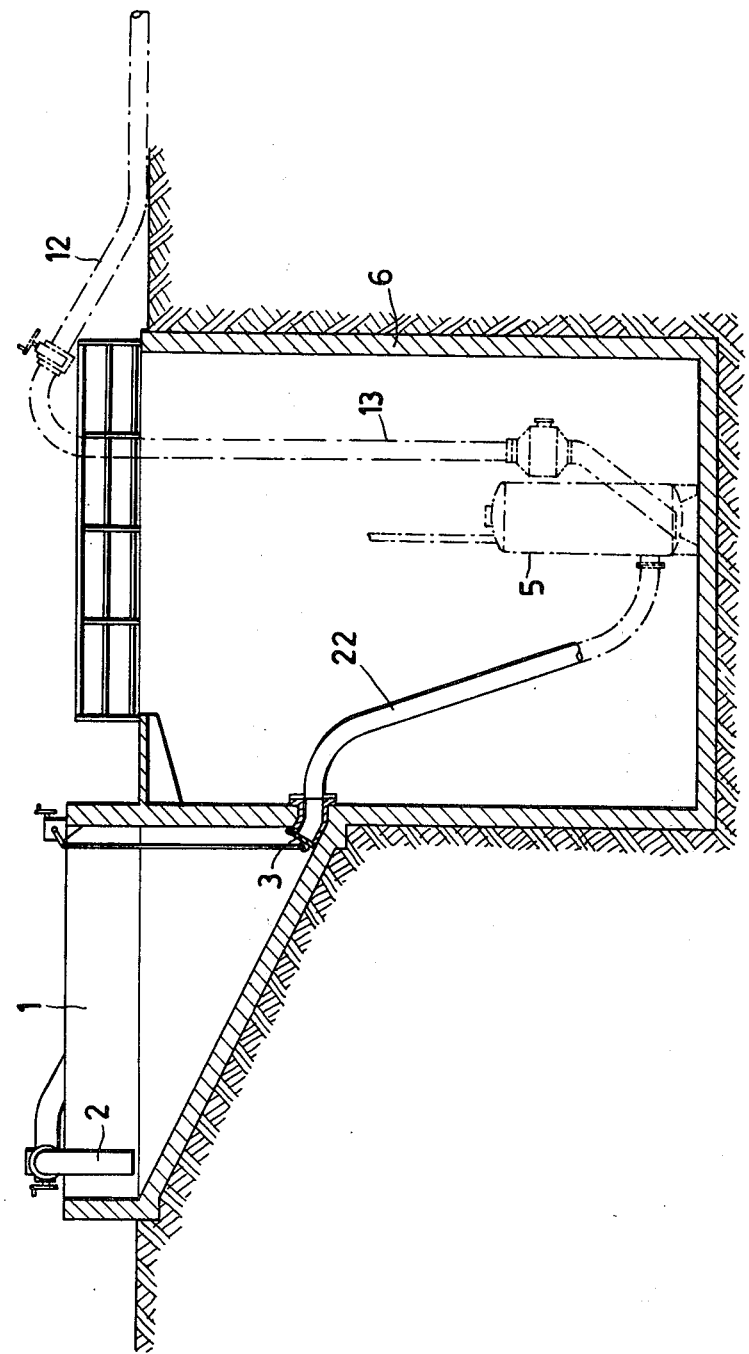

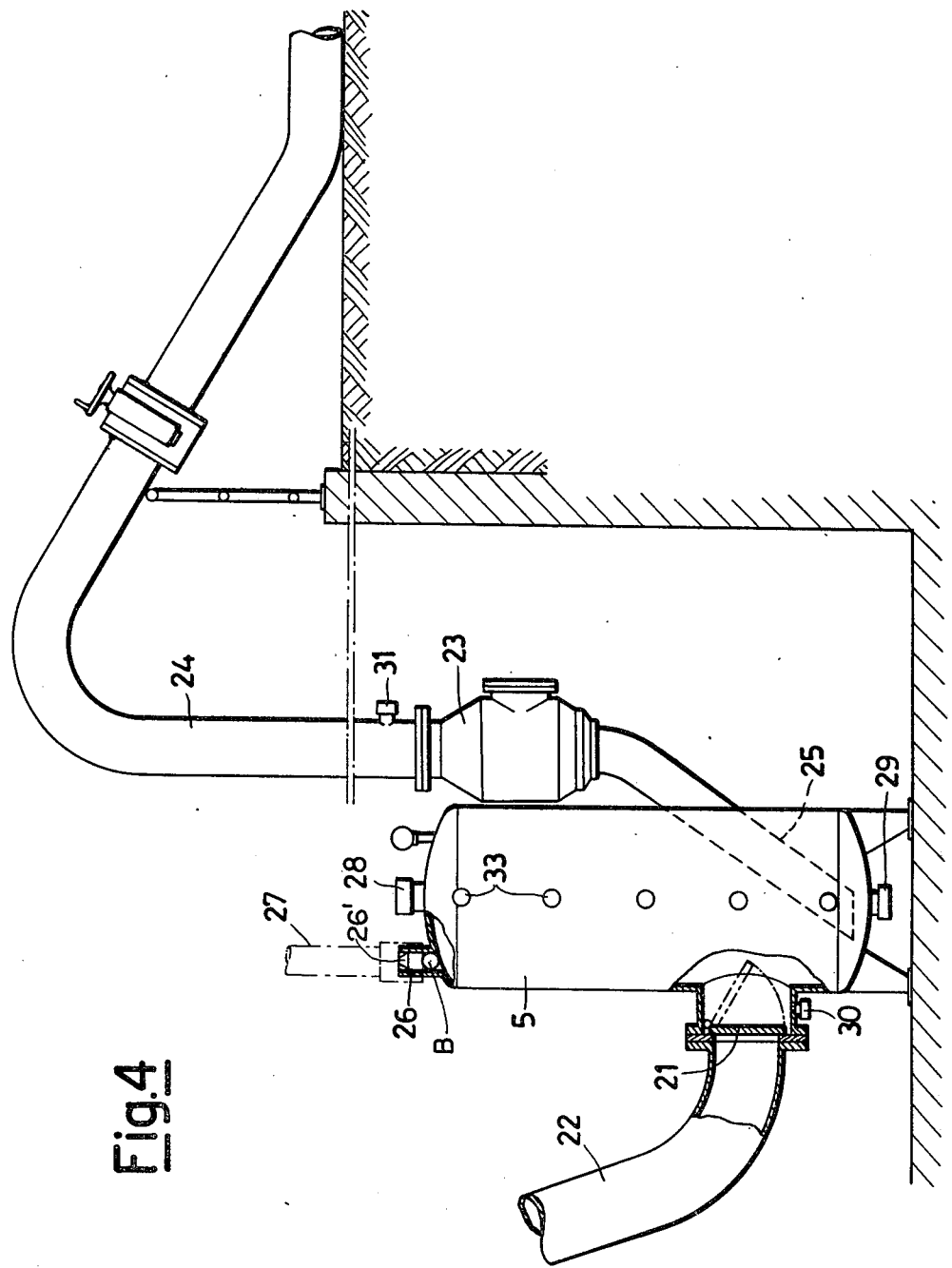

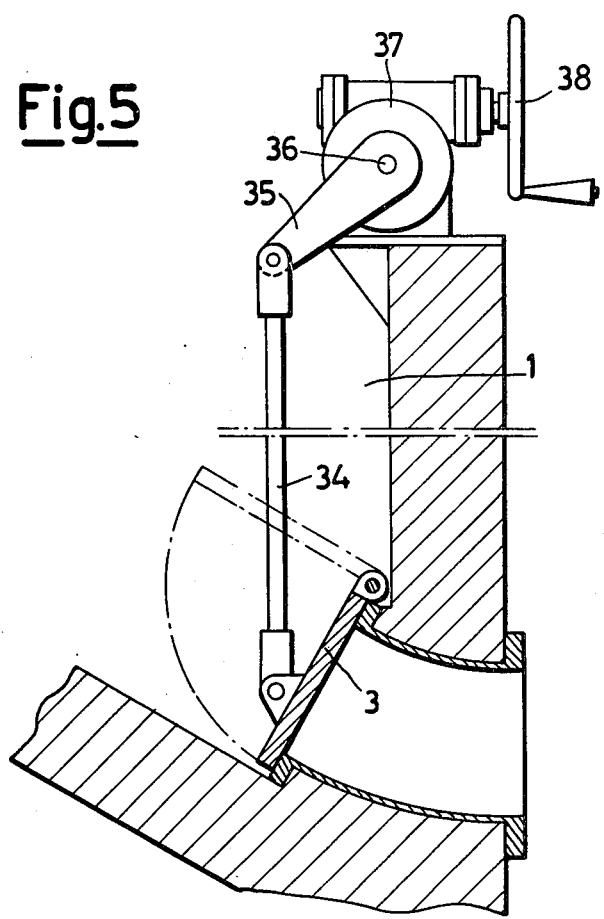

APPARATUS FOR THE LONG DISTANCE CONVEYING OF LIQUIDS MIXED WITH SOLID SUBSTANCES USING A COMPRESSED AIR PUMP

This is a continuation, of application Ser. No. 339,288, filed Mar. 8, 1973 now abandoned.

The present invention relates to an apparatus which enables liquids or more or less viscous liquid substances, and especially liquids containing a high percentage of solid material in suspension, to be conveyed long distances. It finds particular use in the case of transport of industrial waste to a distance, or of dredging water containing high percentages of solid materials such as sand, mud, clay or various deposits. A particular case of use of this apparatus is the restoration of marine beaches subject to erosion, by means of sand mixed with water taken from distant areas which are rich in sand.

The apparatus which forms the object of the invention consists of a compressed air pump comprising a pump body formed from two or more vertical cylindrical chambers (hereinafter called "cylinders" for brevity), each provided with an inlet valve and a discharge valve for the liquid, and a connection for the inlet and discharge of the air which originates from a motor driven compressor and which is cyclically and alternately fed to or expelled from the cylinders of the body through an appropriate rotary distributor. The presence of more than one cylinder, usually three, is necessary to give a greater uniformity of flow of the liquid in the conveying pipe.

One characteristic of the apparatus according to the invention consists of the fact that it comprises a free surface hopper disposed upstream and above the pump body, said hopper being designed to collect the arriving liquid and feed the liquid by simple gravity to the various cylinders of the pump body through the corresponding inlet valves.

A further characteristic of the apparatus is that the pump body is provided with a reserve cylinder, analogous to the other operating cylinders, both the inlet ducts and delivery ducts being provided with shut-off valves disposed in such a manner as to enable the reserve cylinder to be connected and any other cylinder to be excluded for any repair work which may be necessary.

It should be noted that the pneumatic pumps of the type used in the present invention are widely known.

The object of the present invention is particularly an apparatus which by utilising the operational principle of these pumps enables very viscous liquids or liquids containing high percentages of solid material in suspension, in particular mud, to be transported to a distance with such guarantees of operational reliability as to enable continuous working 24 hours per day, which is particularly useful when pumping industrial refuse such as blast furnace slag etc. to a distance.

One embodiment of the apparatus according to the present invention is shown in the accompanying drawings in which:

FIGS. 2 and 3 are sectional views on the lines II—II and III—III of FIG. 1;

FIG. 4 is a detailed view on an enlarged scale of one of the cylinders of the pump body;

FIG. 5 is a detailed view of a valve connected between the hopper and pipe feeding the liquid to one of the cylinders of the pump body.

Figure 1:
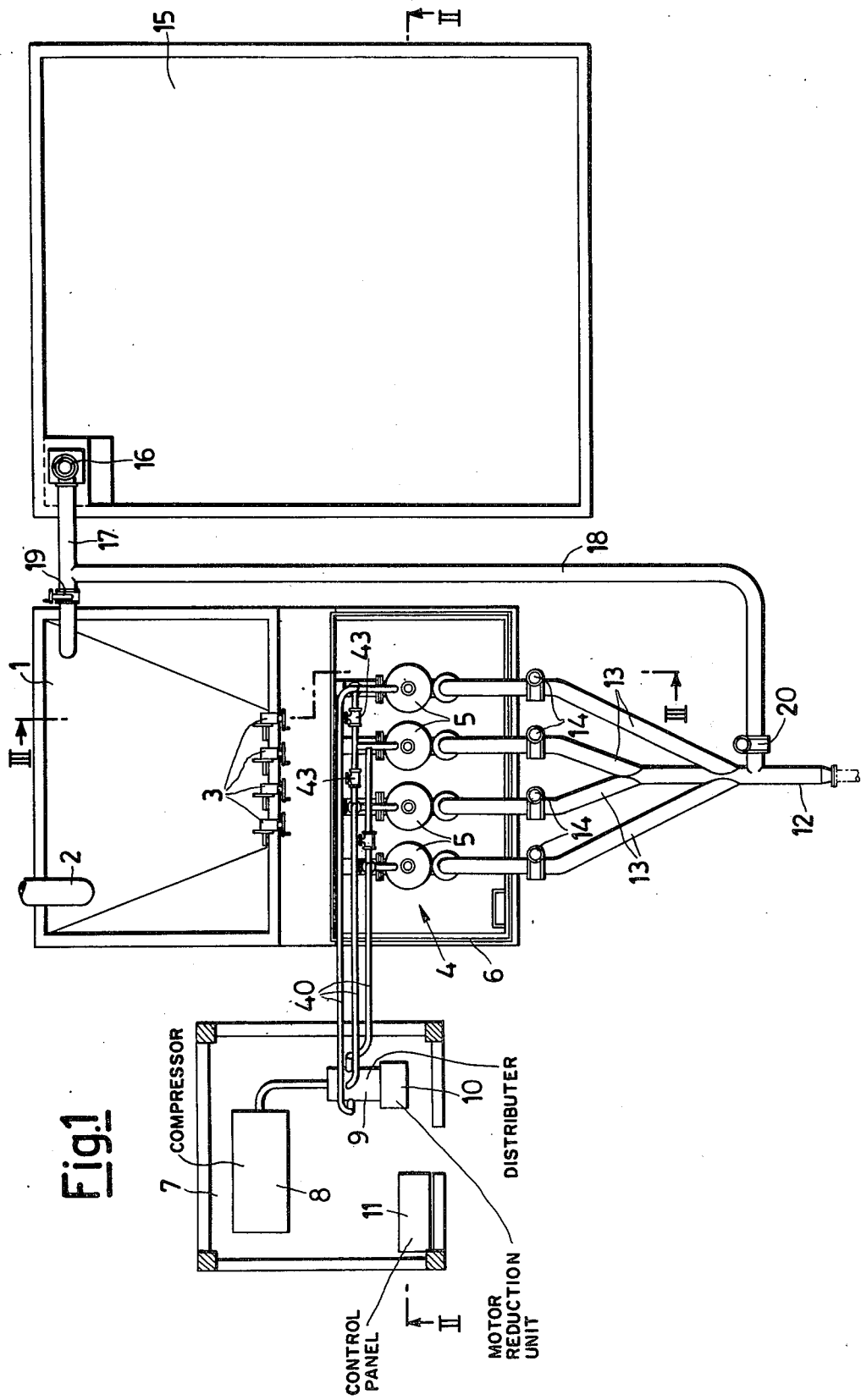
FIG. 1 is a plan view of the apparatus according to the invention.

The apparatus illustrated comprises: (a) a loading hopper 1 having a bottom surface of substantial expanse and designed to receive the liquid to be conveyed (such as for example liquid industrial waste or a mixture of water and sand originating from a dredging plant) through one or more open ended pipes 2 disposed adjacent one side of the bottom of hopper 1, and to feed through suitable outlet valves 3, situated at a side of the hopper bottom remote from pipes 2, the cylinders of (b) a pump body generally indicated by the reference numeral 4, consisting in the case illustrated of four cylinders 5, three of which operate normally and one is a spare, said cylinders being housed in a chamber 6 and all disposed below the level of said outlet valves 3 of the hopper 1; (c) a station generally indicated by the reference numeral 7 for the production and distribution of compressed air, comprising an electric motor driven compressor 8 connected to a distributor of rotary type, such as are disclosed in U.S. Pat. Nos. 3,319,654 and 3,552,884, incorporated by reference, or other type 9 with three ports operated by a motor reduction unit 10, and a control panel 11; (d) a pressure conveyor pipe 12 into which all the delivery pipes 13 from the four cylinders 5 flow through the respective butterfly valves 14 connected in them; (e) possibly a tank 15 containing clear water for periodically washing the entire apparatus, said tank being provided with an electric driven pump 16 connected by suitable pipes 17 and 18 and relative shut-off valves 19, 20 respectively to the hopper 1 and to the conveying pipe 12 which must be of substantial length to facilitate long distance conveying as mentioned above.

FIG. 4 shows on an enlarged scale a partially sectional elevational view of any one of the cylinders 5 which constitute the pump body 4. Said cylinder consists of a closed cylindrical chamber 5, provided with a flap valve 21 for the entry of the liquid to be conveyed which arrives from the feed pipe 22 connected by way of the corresponding shut-off valve and outlet valve 3 to the hopper 1. The same cylinder is provided with a delivery valve 23 for the liquid, preferably of the ball type, said valve being connected between the delivery pipe 24 and a dip pipe 25 which opens just above the bottom of the cylinder. The cylinder is further provided with a dome with a connection 26 for the entry and discharge of the compressed air, connected to the corresponding port of the distributor 9 by means of the connection pipe 27 at the bottom of which there is a float valve B with a seat 26' against which it may be floatingly urged in a manner after the structure and mode of operation of floating valves disclosed in U.S. Pat. Nos. 3,319,654 and 3,552,884 which are incorporated by reference. Finally there is a discharge connection 28, two connections 30 and 31 for cleaning and the possible blowing of air for agitating the liquid mixture and inspection ports 33 situated at various levels.

FIG. 5 is an enlarged view of one of the four outlet valves 3 of the hopper 1, the flap 3 of which, hinged at 3', is opened or closed by a link mechanism comprising an operating rod 34 coupled to the end of the crank 35 mounted on the shaft 36 of a helical gear-worm pair 37 driven by a handwheel 38.

The apparatus is normally operated with only three cylinders 5, excluding the fourth which acts as a spare so that it may replace any of the other three in case of damage or repair, so avoiding any interruption to the operation of the plant; the three pipes 40 feeding compressed air from the distributor 9 are connected to the four pipes 27 which feed the four cylinders 5 by way of intermediate branches such as 41–42 and shut-off valves generally indicated by the reference numeral 43, so that by simply operating said valves it is possible to shut off the air feed to any one of the cylinders 5, allowing the air to feed freely to the other three.

In order to start the operation of the apparatus, it is necessary to open only three of the four outlet valves 3 of the hopper 1, keeping the fourth closed which communicates with the inlet valve of the corresponding cylinder 5 kept in reserve, and simultaneously operating the valves 43 so as to prevent air entering said reserve cylinder. Having done this, the motor driven compressor 8 and geared motor 10 connected to the distributor 9 are started in order to make the cylinders 5, already filled with liquid, operate so as to be alternately and cyclically emptied and filled with liquid arriving from the hopper by simple gravity, delivering the liquid into the conveying pipe 12.

What I claim is:

1. An apparatus for conveying liquids mixed with solid substances to long distances as in transporting industrial waste or in dredging operations, by means of a compressed air pump comprising a pump body formed from two or more vertical cylindrical chambers, each of said chambers being provided with a one-way self-closing inlet flap valve adjacent the lower end of each of said chambers and an inlet pipe for the liquid connected to each of said chambers upstream of said flap valve, a valve and a pipe for delivering the liquid to a conveying pipe operably connected thereto, said conveying pipe being of substantial length for conveying to a long distance, and a connection for the inlet and discharge of compressed air from a motor driven compressor unit, which is cyclically and alternately fed into the cylinders and successively expelled from them through an appropriate distributor, said apparatus comprising a free surface loading hopper located upstream and above the pump body, said hopper having an inclined bottom surface of substantial expanse designed to receive and hold the arriving liquid, to compensate its flow rate if this should be variable, said inlet pipe being connected at its upstream end to said hopper adjacent the lowest elevational level of said inclined surface whereby liquid may be continually fed by simple gravity from said hopper and said inlet pipe to the individual chambers through the corresponding inlet valves for the liquid, a hopper outlet valve for liquid being situated in the upstream end of each of said inlet pipes and adjacent said lowest level of said bottom surface of said hopper and means for introducing liquid into said hopper over said bottom surface adjacent a side thereof remote from said lowest level at which said hopper outlet valves for liquid are adjacent, said pump body being provided with at least one spare chamber in addition to the necessary chambers (generally three in number) for the normal and regular operation of the pump, and further connecting pipes with relative shut-off valve for air being disposed between the various connections for the inlet and discharge of compressed air of the various cylindrical chambers and between the various liquid pipes so as to be able to connect the spare chamber into the pump circuit and disconnect any one of the other chambers.

* * * * *